RASTER DISTORTION CORRECTION CIRCUIT

Filed Aug. 14, 1967

Inventor
DON A. KRAMER
BY Mueller, Aichele & Rauner
ATTYS.

United States Patent Office 3,479,554

Patented Nov. 18, 1969

3,479,554

RASTER DISTORTION CORRECTION CIRCUIT

Don A. Kramer, Rolling Meadows, Ill., assignor to Motorola, Inc., Franklin Park, Ill., a corporation of Illinois Filed Aug. 14, 1967, Ser. No. 660,304

Int. Cl. H01j *29/70*

U.S. Cl. 315—24 4 Claims

ABSTRACT OF THE DISCLOSURE

The circuit includes a gating network the conduction of which is changed at a vertical rate. Oppositely phased pulses at the horizontal frequency are applied to the network to provide a pair of oppositely phased pulsating signals with amplitudes which vary throughout the vertical deflection period. The portion of one of the pulsating signals which occurs during an initial part of the vertical period and the portion of the other signal which occurs during a terminal part of the period are coupled by a switching network through amplitude control devices to provide a correction signal for the vertical yoke.

BACKGROUND OF THE INVENTION

The use of wide deflection angle cathode ray tubes, particularly those having a relatively flat rectangular viewing screen results in distortion of the raster. In black and white receivers this is corrected by modifying the deflection yokes to provide a non-symmetrical sweep when a substantially linear sawtooth is applied. However with the relatively complicated deflection systems of tri-gun cathode ray tubes of the type used in color television receivers, it is desirable to avoid introducing any non-symmetrical convergence errors so that essentially linear field yokes are preferable. This requires that the distortion be corrected by modifying the waves generated in the deflection systems rather than by modification of the yoke structure.

Vertical distortion which causes the top and bottom of the raster to become bent may be corrected by modifying the vertical deflection signal with a correction signal occurring at the horizontal deflection frequency. Generally the raster distortion takes the form of a pincushion with the top and bottom being parabolically bent towards the center of the raster in which case the correction signal should consist of parabolic components or an approximation thereof. Since the distortion at the top and bottom of the raster is a maximum whereas the distortion at the center is approximately zero, it is necessary that the amplitude of the correction signal vary throughout the vertical deflection period. For pincushion distortion, both the top and the bottom bend towards the center so that it is also necessary o reverse the phase of the correction signal at the center of the raster. Thus the signal should consist of one portion of a given phase and declining amplitude and a second portion of opposite phase and increasing amplitude. It is desirable to provide independent amplitude control of the two portions in order to compensate for nonuniform characteristics of the receiver components such as the yoke, the cathode ray tube and the sweep systems.

In the past, a pair of signals having a particular amplitude variance characteristic were combined to provide the correction signal but since each existed throughout the deflection period, the amplitude of one portion of the correction signal could not be changed without affecting the amplitude of the other portion so that independent correction of the top and bottom of the raster to compensate for variances in different receivers was not possible. Also, varying the amplitude of the correction signal would shift the point at which its amplitude was zero so that the signal would no longer be aligned with the point on the raster at which zero distortion occurred.

SUMMARY OF THE INVENTION

It is therefore an object of the invention to provide an improved raster distortion correction circuit which has means to independently control the amount of correction on two opposing borders of the raster.

A further object is to provide a raster distortion correction circuit which has means to control the amplitude of the correction signal without shifting the point at which the amplitude reaches zero.

In practicing a preferred form of the invention, the vertical sawtooth signal and opposite phases of the horizontal pulses are coupled to a gating circuit to provide first and second oppositely poled pulsating signals having amplitudes which change throughout the vertical deflection period. A switching circuit couples the portion of one of the pulsating signals which occurs during an initial part of the vertical period and the portion of the other pulsating signal which occurs during a terminal part of the period to a circuit which individually controls the amplitudes of such portions. A resonant circuit converts such portions into a correction signal which has one phase and declining amplitude during the initial part of the vertical deflection period and of opposite phase and increasing amplitude during the terminal part of such period.

DETAILED DESCRIPTION OF THE PREFERRED EMBODIMENT

Figures 1, 2:
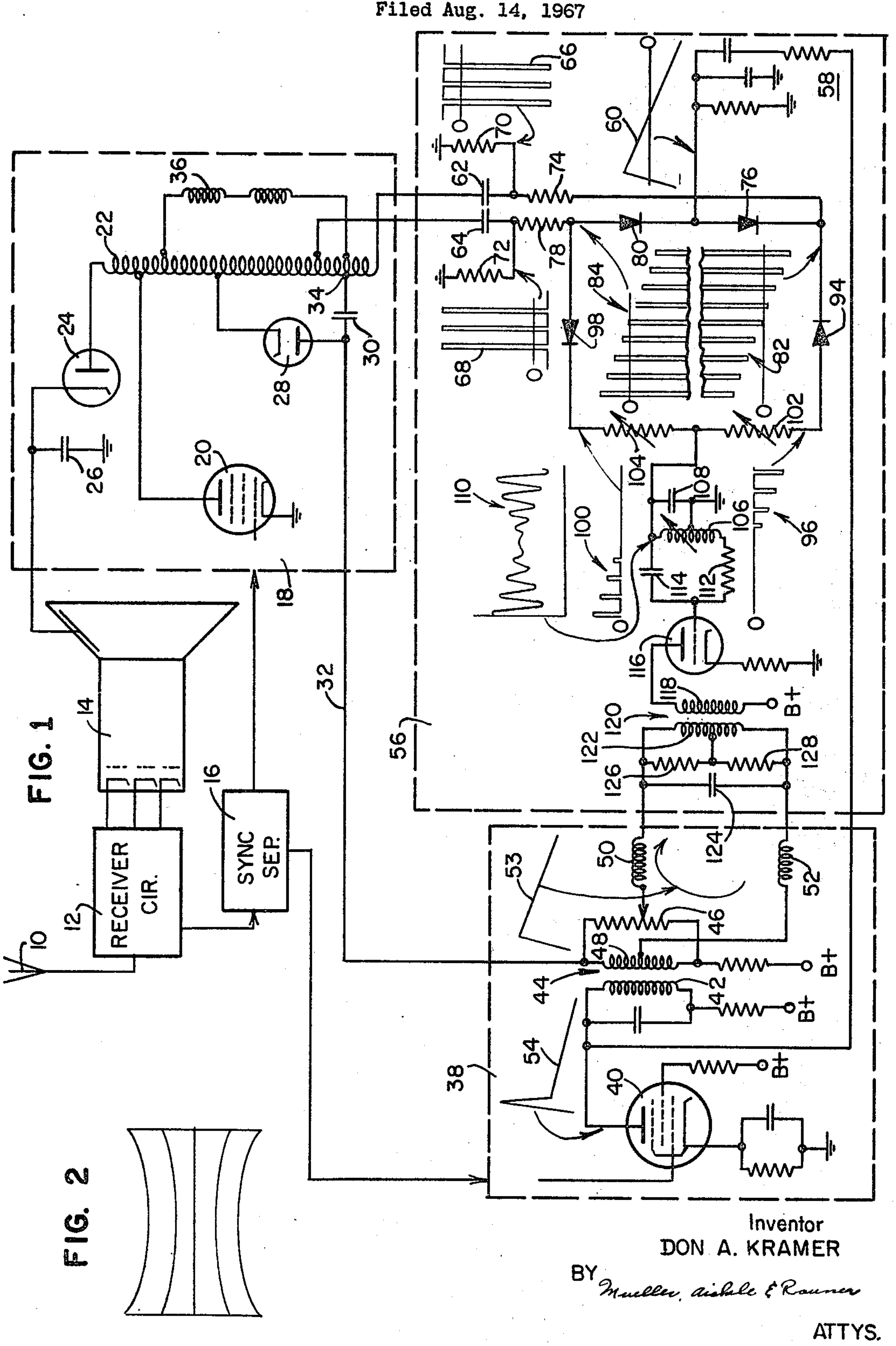
FIG. 1 illustrates a television receiver partially in block and partially in schematic incorporating the features of the invention.
FIG. 2 illustrates a raster having distorted top and bottom.

Referring now to the television receiver of FIG. 1, a television signal is received by antenna 10 and processed in a known manner by receiver circuit 12 to produce video information for a multi-gun cathode ray tube 14. Horizontal synchronizing signals are separated from the video information in a synchronizing signal separator circuit 16 and are coupled to a horizontal sweep and high voltage system 18 which includes a vacuum tube pentode 20 coupled to a tap of autotransformer 22. A diode 24 and a filter capacitor 26 coupled to the upper end of transformer 22 rectifies and filters horizontal pulses appearing in such transformer to provide high voltage for the final anode of cathode ray tube 14. A damper diode 28 and a boost capacitor 30 are coupled in series across a portion of the transformer 22. A DC potential on conductor 32 is coupled to the junction of diode 28 and capacitor 30, and by known operation, a "boost" voltage is provided on tap 34 of transformer 22. The system 18 causes a sawtooth current to flow in the horizontal deflection winding 36 located on the neck of the cathode ray tube 14. Such current has a trace portion to horizontally sweep the electron beams across the screen of cathode ray tube 14 for depicting the video information. The current also has a retrace portion to rapidly return the beams to the left hand side of the raster.

Vertical synchronizing signals are separated from the video information in synchronizing signal separator circuit 16 and are coupled to a vertical sweep system 38 which includes a vacuum tube pentode 40 for supplying sawtooth sweep signals to the primary winding 42 of vertical output transformer 44. A centering control potentiometer 46 is coupled between the tops of the secondary bifilar winding 48 of transformer 44. The center arm of the potentiometer 46 is coupled to one of the vertical deflection windings 50 and the center tap of the secondary winding 48 is coupled to the other vertical deflection winding 52. It is to be understood that the windings 50 and 52 form part of the deflection yoke located on the neck of the cathode ray tube 14. By known operation, a sawtooth current 53 is caused to flow through the windings 50 and 52 for vertically deflecting the electron beams of the cathode ray tube 14.

FIG. 2 illustrates a raster depicted on the screen of cathode ray tube 14. It will be assumed that the television receiver includes sufficient horizontal correction to provide the straight sides shown. If there is no vertical correction, the top and bottom of the raster may bend parabolically inwardly, this characteristic being known as vertical pincushion distortion. The invention contemplates coupling a correction signal to the vertical deflection windings 50 and 52 to correct such distortion. In order to accomplish this, the trapezoidal signal 54 appearing on the plate of the pentode 40 in the vertical sweep system 38 is coupled to a vertical pincushion correction circuit 56 which includes an integrating circuit 58 to convert the trapezoidal waveform 54 into a sawtooth signal 60.

A pair of capacitors 62 and 64 are respectively coupled to taps on autotransformer 22 in horizontal deflection system 18 preferably an equal number of turns above and below tap 34 and since the AC signal at tap 34 is essentially zero, a pair of oppositely poled pulsating signals 66 and 68 at the horizontal deflection frequency is thereby provided. The signals are referenced to ground by means of resistors 70 and 72. It should be noted that generally the amplitudes of signals 66 and 68 will be at least twenty times the amplitude of sawtooth signal 60.

The negatively poled signal 66 at the horizontal frequency is applied through resistor 74 to the cathode of a first gating diode 76, and the positively poled signal 68 at the horizontal frequency is applied through resistor 78 to the anode of a second gating diode 80. The sawtooth signal 60 at the vertical frequency is applied to the anode of diode 76 and to the cathode of diode 80 to control the respective conductions thereof. At the beginning of the vertical deflection period, signal 60 has a maximum positive value so that diode 76 presents a relatively small impedance to the pulsating signal 66 and therefore shunts a maximum portion of the signal 66 through the network 58 to ground. The conduction of diode 76 linearly decreases during the vertical deflection period so that less and less of signal 66 is shunted to ground. Thus, on the cathode of the diode 76 appears a negatively poled pulsating signal 82 the lower peak amplitude of which decreases from a maximum positive value at the beginning of the vertical deflection period to a maximum negative value at the end of such period. The signal 60 increases the conduction of the second gating diode 80 during the vertical deflection period so that the positively poled pulsating signal 84 on the anode of diode 80 has an upper peak amplitude which decreases from a maximum positive value to a minimum negative value. It should be noted that although only nine pulses are shown to exist during the vertical deflection period in order to facilitate illustration, it is known that in actuality there are 262½ such pulses.

The signal 82 is coupled to a first switching diode 94 which is poled to translate only the negative portion of the signal 90 to thereby provide the negatively poled pulsating signal 96 on the cathode of diode 94. A second switching diode 98 is poled to translate only the positive portion of the signal 84 and thereby provide the positively poled pulsating signal 100.

A pair of potentiometers 102 and 104 are coupled in series across the outputs of the switching diodes 94 and 98 to combine the signals 96 and 100 and also to provide independent amplitude control thereof. The junction of the potentiometers 102 and 104 is coupled to a resonant circuit comprising a coil 106 and a capacitor 108 tuned to the horizontal deflection frequency. The pulses in signals 100 and 96 ring the resonant circuit to respectively provide the initial and terminal parts of a sinusoidal signal 110. Accordingly, the amplitude of signal 110 linearly decreases from a maximum value at the beginning of the vertical deflection period. At the middle of the period the amplitudes of signals 96 and 100 are zero, and thus the amplitude of signal 110 is zero. During the terminal part of the period, the amplitude of signal 110 linearly increases and because pulsating signal 96 has a phase opposite to the phase of signal 100, the phase of signal 110 is similarly reversed.

For reasons to be explained, the signal 110 is phase shifted by the coil 106, a resistor 112 and a capacitor 114. The phase shifted signal is amplified by a vacuum tube 116 and applied to the primary winding 118 of a transformer 120. The secondary winding 122 is coupled in series with the vertical deflection windings 50 and 52 to add the current counterpart of the correction signal 110 to the sawtooth current 53 generated by the vertical sweep system 38. A capacitor 124 coupled across the secondary winding 122 resonates therewith to provide a broadly tuned circuit centered at the horizontal deflection frequency. A pair of resistors 126 and 128 are coupled in series and across the secondary winding 122 with their junction coupled to a tap on such winding. These resistors provide a balance point for the phase shifted and amplified sinusoidal signal 110.

A sine wave forms a fairly good approximation of a parabola and therefore is useful to correct the parabolic pincushion distortion of the top and bottom of the raster as shown in FIG. 2. For example, the top of the raster is parabolically bent downwardly and therefore a correction signal parabolically bent upwardly would be ideal, but sinusoidal components such as found in the correction signal 110 will provide adequate correction. However the positive peaks of the signal 110 occurring during the initial part of the vertical period coincide with the pulses in signal 100, and the negative peaks of signal 110 occurring during the terminal part of the period coincide with the pulses in signal 96. Since these pulses occur during horizontal retrace of the cathode ray beams, it is necessary that the current counterpart of the correction signal 110 be 180° out of phase with the signal 110 so that the positive peaks of each cycle which occur during the initial part of the vertical period and the negative peaks which occur during the terminal part occur midway between retrace pulses. Since the signal 110 represents voltage, there will be a 90° phase shift provided by the vertical deflection windings 52 and 54 when it is converted into current. The additional 90° is provided by the phase shift network comprised of coil 106, resistor 112 and capacitor 114. Coil 106 has variable inductance in order to compensate for capacitor 108 variations and the various characteristics of different receivers by moving the sine wave with reference to the horizontal retrace pulses to align the point of maximum correction with the point of maximum distortion.

Now, the first cycle of the current counterpart of signal 110 will have a maximum positive amplitude to compensate for the maximum downward bending at the top of the raster. The amplitude of such current decreases toward the middle of the vertical deflection period to approximate the decreasing distortion of the raster. Approximately at the center where there is no distortion, signal 110 has zero amplitude and therefore desirably provides no correction. The cycles toward the terminal part of the vertical period are 180° out of phase with those during the initial part and are therefore the proper polarity to correct the upward bending of the raster. The amplitude increases until at the bottom of the vertical period where the distortion is greatest, the amplitude of the sine wave is again a maximum.

It is rare to find a receiver in which the top and bottom of the raster are equally distorted because of differences in the characteristics of the cathode ray tube, the sweep circuits and the yokes. It is therefore desirable to provide independent control of the amount of correction for the top and for the bottom. The novel pincushion correction circuit 56 accomplishes this by providing separate signals 96 and 100 so that adjusting potentiometer 102 controls only the amplitude of signal 96, and adjusting potentiometer 104 controls only the amplitude of signal 100. This is true because potentiometer 102 and diode 94 present a much larger impedance to signal 100 than does the resonant and phase shifting circuit and therefore adjustment of potentiometer 102 has a minimum effect on signal 100. Similarly adjustment of potentiometer 104 has a minimum effect on signal 106. Since signal 100 exists only during the initial part of the vertical deflection period, and signal 96 exists only during the terminal part thereof, independent amplitude control of these signals and therefore independent correction of the top and bottom of the raster may be achieved. Equally as important is the fact that changing the amplitude of signal 96 and/or signal 100 has no effect on the point where their amplitudes are zero so that the point of zero correction on signal 110 remains unaffected and aligned with the zero distortion point on the raster. Prior art circuits in addition to having no independent amplitude control, have no similar provision for maintaining a constant zero correction point with adjustment of the amount of correction.

It should be noted that the correction signal is applied to the vertical deflection windings 52 and 54 through the transformer 120, and the vertical sawtooth current 53 is applied through transformer 44. In some prior art circuits the sawtooth current is modified in the vertical sweep system in which case a rather large and expensive transformer would be necessary in order to accommodate both the high frequency horizontal sweep signal and the low frequency vertical sweep signal.

What has been described therefore is an improved raster distortion correction circuit where the amount of correction at the opposing borders may be independently controlled without shifting the point at which zero correction is provided.

I claim:

1. In a television receiver having a cathode ray tube, horizontal and vertical deflection windings for horizontally and vertically deflecting an electron beam of the cathode ray tube to form a raster with a top and a bottom having a tendency to be bent inwardly, a vertical sweep system for energizing the vertical deflection winding with vertical sweep signals at a vertical sweep frequency, a horizontal sweep system for energizing the horizontal deflection winding and for providing pulse signals of opposite phases at a horizontal sweep frequency, a pincushion correction circuit including in combination; first and second gating means coupled to the vertical and horizontal sweep systems, said first and second gating means being responsive to the vertical sweep signals for simultaneously changing the conduction thereof at the vertical sweep frequency, said first gating means further being responsive to a pulse signal of one phase and the vertical sweep signal to provide a first pulsating signal the amplitude of which changes during the vertical deflection period, said second gating means being responsive to a pulse signal of opposite phase to said one phase and the vertical sweep signal to provide a second pulsating signal the amplitude of which changes during the vertical deflection period, first switching means coupled to said first gating means to translate a first portion of said first pulsating signal which occurs during an initial part of the deflection period and second switching means coupled to said second gating means to translate a second portion of said second pulsating signal which occurs during a terminal part of the deflection period, circuit means coupled to said vertical deflection winding, control means comprising first and second potentiometers coupled to said first and second switching means respectively, said first and second potentiometers further being coupled together with the junction thereof being coupled to said circuit means to combine said first and second pulsating signal portions and to permit individual control of the amplitude of said first portion of said first pulsating signal and said second portion of said second pulsating signal, said first and second pulsating signal portions acting to produce a correction signal in said vertical deflection winding at the horizontal sweep frequency of one phase and declining amplitude during said initial part and of opposite phase and increasing amplitude during said terminal part.

2. In a television receiver having a cathode ray tube, horizontal and vertical deflection windings for horizontally and vertically deflecting an electron beam of the cathode ray tube to form a raster with a top and a bottom having a tendency to be bent inwardly with said bending having a tendency to be parabolical, a vertical sweep system for energizing the vertical deflection winding with vertical sweep signals at a vertical sweep frequency, a horizontal sweep system for energizing the horizontal deflection winding and for providing pulse signals of opposite phases at a horizontal sweep frequency, a pincushion correction circuit including in combination; first and second gating means coupled to the vertical and horizontal sweep systems, said first and second gating means being responsive to the vertical sweep signals for simultaneously changing the conduction thereof at the vertical sweep frequency, said first gating means further being responsive to a pulse signal of one phase and the vertical sweep signal to provide a first pulsating signal the amplitude of which changes during the vertical deflection period, said second gating means being responsive to a pulse signal of opposite phase to said one phase and the vertical sweep signal to provide a second pulsating signal the amplitude of which changes during the vertical deflection period, first switching means coupled to said first gating means to translate a first portion of said first pulsating signal which occurs during an initial part of the deflection period and second switching means coupled to said second gating means to translate a second portion of said second pulsating signal which occurs during a terminal part of the deflection period, control means coupled to said first and second switching means to combine said first and second pulsating signal portions, circuit means coupling said control means to said vertical deflection winding to produce a correction signal therein at the horizontal sweep frequency of one phase and declining amplitude during said inital part and of opposite phase and increasing amplitude during said terminal part, said circuit means including a resonant circuit tuned to a frequency near the horizontal sweep frequency to convert the combination of said first and second portions of said pulsating signals into a sinusoidal signal to approximate shape of and compensate for the top and bottom.

3. The television receiver set forth in claim 2 wherein said circuit means includes a phase shifting network to shift the phase of said sinusoidal signal approximately 90°, said vertical deflection winding having inductance to shift the current flowing therein 90° from the sinusoidal signal applied thereto, to thereby effect approximately 180° phase shift and cause the peaks of the individual components of said correction signal to appear between successive components of said pulsating signal.

4. The television receiver set forth in claim 3 wherein said circuit means includes an electron amplifier device coupled between said phase shifting network and the vertical deflection winding.

References Cited

UNITED STATES PATENTS

| | | | |
|---|---|---|---|
| 2,682,012 | 6/1954 | Lockhart. | |
| 2,829,303 | 1/1958 | Knechtli. | |

| | | | |
|---|---|---|---|
| 3,320,469 | 5/1967 | Slavik. | |
| 2,649,555 | 8/1953 | Lockhart. | |
| 2,753,394 | 7/1956 | White | 307—257 X |
| 2,955,265 | 10/1960 | Lindsay | 332—47 |

RODNEY D. BENNETT, Jr., Primary Examiner

J. G. BAXTER, Assistant Examiner

U.S. Cl. X.R.

307—237, 257; 332—47